(12) United States Patent
Lin et al.

(10) Patent No.: US 12,651,593 B2
(45) Date of Patent: Jun. 9, 2026

(54) INTENT RECOGNITION METHODS, APPARATUSES, AND DEVICES

(71) Applicant: Alipay (Hangzhou) Information Technology Co., Ltd., Hangzhou (CN)

(72) Inventors: Jinzhen Lin, Hangzhou (CN); Zhenzhe Ying, Hangzhou (CN); Weiqiang Wang, Hangzhou (CN)

(73) Assignee: Alipay (Hangzhou) Information Technology Co., Ltd., Hangzhou (CN)

(*) Notice: Subject to any disclaimer, the term of this patent is extended or adjusted under 35 U.S.C. 154(b) by 390 days.

(21) Appl. No.: 18/305,985

(22) Filed: Apr. 24, 2023

(65) Prior Publication Data

US 2023/0343327 A1 Oct. 26, 2023

(51) Int. Cl.
*G10L 15/06* (2013.01)
*G10L 15/02* (2006.01)
*G10L 15/04* (2013.01)

(52) U.S. Cl.
CPC ............ *G10L 15/063* (2013.01); *G10L 15/02* (2013.01); *G10L 15/04* (2013.01)

(58) Field of Classification Search
CPC ..... G06F 40/30; G06F 16/3329; G10L 15/02; G10L 17/02; G10L 15/03; G10L 15/04; G10L 15/063
USPC ........................................................ 704/200
See application file for complete search history.

(56) References Cited

U.S. PATENT DOCUMENTS

| | | | | |
|---|---|---|---|---|
| 10,262,062 B2 * | 4/2019 | Chang | ................. | G06F 16/3329 |
| 11,651,768 B2 * | 5/2023 | Vishnoi | ................. | G10L 15/02 |
| | | | | 704/231 |
| 11,714,840 B2 * | 8/2023 | Chen | ................. | G06F 16/3329 |
| | | | | 707/771 |
| 11,735,207 B1 * | 8/2023 | Venkataraman | ........ | G10L 15/26 |
| | | | | 704/200 |
| 2020/0242302 A1 * | 7/2020 | Liang | ................. | G06F 16/243 |
| 2021/0224479 A1 * | 7/2021 | Xu | ................. | G06N 3/045 |
| 2022/0084508 A1 * | 3/2022 | Kuo | ................. | G10L 15/02 |
| 2022/0094649 A1 * | 3/2022 | Le | ................. | G06F 40/35 |
| 2022/0230629 A1 * | 7/2022 | Zhu | ................. | G06N 3/042 |

(Continued)

FOREIGN PATENT DOCUMENTS

| | | |
|---|---|---|
| CN | 111695052 A | 9/2020 |
| CN | 112800239 A | 5/2021 |
| CN | 113326351 A | 8/2021 |

(Continued)

OTHER PUBLICATIONS

Ba, J. L., Kiros, J. R., & Hinton, G. E. (2016). Layer normalization. arXiv preprint arXiv:1607.06450. (Year: 2016).*

*Primary Examiner* — Richemond Dorvil

(74) *Attorney, Agent, or Firm* — Fish & Richardson P.C.

(57) ABSTRACT

Intent recognition is described. Obtained data to be recognized is preprocessed to obtain target data. Feature extraction processing is performed on the target data based on an intent recognition model to obtain a linear feature and a non-linear feature of the target data, where the intent recognition model is obtained by optimizing and training a bidirectional encoder representations from transformers (BERT) model. Intent recognition processing is performed based on the linear feature, the non-linear feature, and the intent recognition model to obtain an intent recognition result of the obtained data to be recognized.

16 Claims, 6 Drawing Sheets

(56)          References Cited

U.S. PATENT DOCUMENTS

2022/0350970 A1*  11/2022  Rizk  ................ G06V 30/19007
2024/0296283 A1*   9/2024  Wei ........................ G06F 18/213

FOREIGN PATENT DOCUMENTS

CN          113722492  A     11/2021
CN          113806645  A     12/2021
CN          114330966  A      4/2022
WO          2019218751 A1    11/2019

* cited by examiner

S102

Preprocess obtained data to be recognized to obtain target data

S104-2

Perform linear feature extraction processing on the target data based on an optimized BERT unit of an intent recognition model to obtain a linear feature of the target data

S104-4

Perform non-linear transformation processing on the linear feature of the target data based on a non-linear feature extraction unit of the intent recognition model to obtain a non-linear feature of the target data

S106-2

Determine an intent classification label corresponding to the data to be recognized based on an intent recognition unit of the intent recognition model, the linear feature, and the non-linear feature

S106-4

Determine an intent recognition result of the data to be recognized based on the intent classification label

FIG. 6

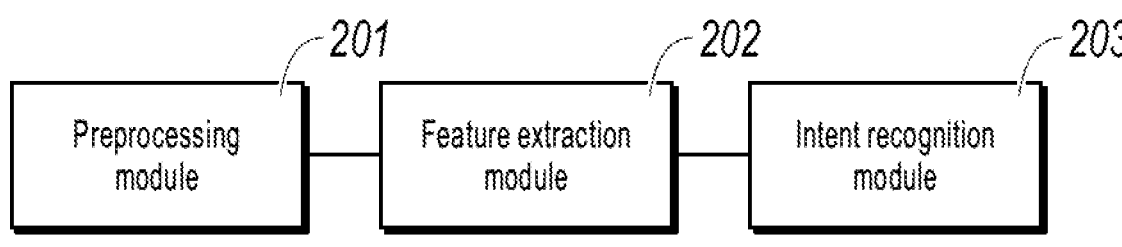

201
Preprocessing module

202
Feature extraction module

203
Intent recognition module

FIG. 7

INTENT RECOGNITION METHODS, APPARATUSES, AND DEVICES

CROSS-REFERENCE TO RELATED APPLICATIONS

This application claims priority to Chinese Patent Application No. 202210453637.0, filed on Apr. 24, 2022, which is hereby incorporated by reference in its entirety.

TECHNICAL FIELD

This specification relates to the field of data processing technologies, and in particular, to intent recognition methods, apparatuses, and devices.

BACKGROUND

With the continuous development of the natural language processing (NLP) technology, an intelligent conversation system is widely used in various scenarios such as a pre-sales consultation scenario, an after-sales service scenario, and a risk control scenario. The intelligent conversation system can reduce labor costs, and can further respond to a user in a timely manner, thereby improving user experience. How to accurately recognize an intent of a user based on a text submitted by the user is the key to the intelligent conversation system.

At present, there are the following two main methods for recognizing the intent of the user: First, a conventional intent recognition model represented by long short-term memory (LSTM) and convolutional neural network for text (TextCNN) or their variants is used. FIG. 1 shows a structure of a conventional intent recognition model combining LSTM and TextCNN. The method is difficult to combine with pre-training knowledge information, and has a poor knowledge reasoning capability. Second, a conventional bidirectional encoder representations from transformers (BERT) model is used, and a structure of the model is shown in FIG. 2. In this method, because there are a very large quantity of parameters, the model takes long time for reasoning. In addition, the BERT Poole cannot extract enough knowledge information, and an intent recognition effect is not good when there are a large quantity of labels. Therefore, how to improve user intent recognition efficiency and recognition accuracy is a technical problem urgently needed to be alleviated.

SUMMARY

One or more embodiments of this specification provide an intent recognition method. The method includes the following: obtained data to be recognized are preprocessed to obtain target data; feature extraction processing is performed on the target data based on an intent recognition model to obtain a linear feature and a non-linear feature of the target data, where the intent recognition model is obtained by optimizing and training a bidirectional encoder representations from transformers (BERT) model; and intent recognition processing is performed based on the linear feature, the non-linear feature, and the intent recognition model to obtain an intent recognition result of the data to be recognized.

One or more embodiments of this specification provide an intent recognition apparatus. The apparatus includes a pre-processing module, configured to preprocess obtained data to be recognized to obtain target data. The apparatus further includes a feature extraction module, configured to perform feature extraction processing on the target data based on an intent recognition model to obtain a linear feature and a non-linear feature of the target data, where the intent recognition model is obtained by optimizing and training a BERT model. The apparatus further includes an intent recognition module, configured to perform intent recognition processing based on the linear feature, the non-linear feature, and the intent recognition model to obtain an intent recognition result of the data to be recognized.

One or more embodiments of this specification provide an intent recognition device. The device includes a processor. The device further includes a memory, configured to store computer-executable instructions. When the computer-executable instructions are executed, the processor is enabled to preprocess obtained data to be recognized to obtain target data; perform feature extraction processing on the target data based on an intent recognition model to obtain a linear feature and a non-linear feature of the target data, where the intent recognition model is obtained by optimizing and training a BERT model; and perform intent recognition processing based on the linear feature, the non-linear feature, and the intent recognition model to obtain an intent recognition result of the data to be recognized.

One or more embodiments of this specification provide a storage medium. The storage medium is configured to store computer-executable instructions. When the computer-executable instructions are executed by a processor, obtained data to be recognized are preprocessed to obtain target data; feature extraction processing is performed on the target data based on an intent recognition model to obtain a linear feature and a non-linear feature of the target data, where the intent recognition model is obtained by optimizing and training a BERT model; and intent recognition processing is performed based on the linear feature, the non-linear feature, and the intent recognition model to obtain an intent recognition result of the data to be recognized.

BRIEF DESCRIPTION OF DRAWINGS

To describe the technical solutions in one or more embodiments of this specification or in the existing technology more clearly, the following briefly describes the accompanying drawings needed for describing the embodiments or the existing technology. Clearly, the accompanying drawings in the following description merely show some embodiments of this specification, and a person of ordinary skill in the art can still derive other drawings from these accompanying drawings without creative efforts.

FIG. 6 is a third schematic flowchart illustrating an intent recognition method, according to one or more embodiments of this specification;

FIG. 7 is a schematic composition diagram illustrating modules of an intent recognition apparatus, according to one or more embodiments of this specification.

DESCRIPTION OF EMBODIMENTS

To make a person skilled in the art better understand the technical solutions in one or more embodiments of this specification, the following clearly and comprehensively describes the technical solutions in the one or more embodiments of this specification with reference to the accompanying drawings in the one or more embodiments of this specification. Clearly, the described embodiments are merely some but not all of the embodiments of this specification. All other embodiments obtained by a person of ordinary skill in the art based on one or more embodiments of this specification without creative efforts shall fall within the protection scope of this specification.

Figure 3:
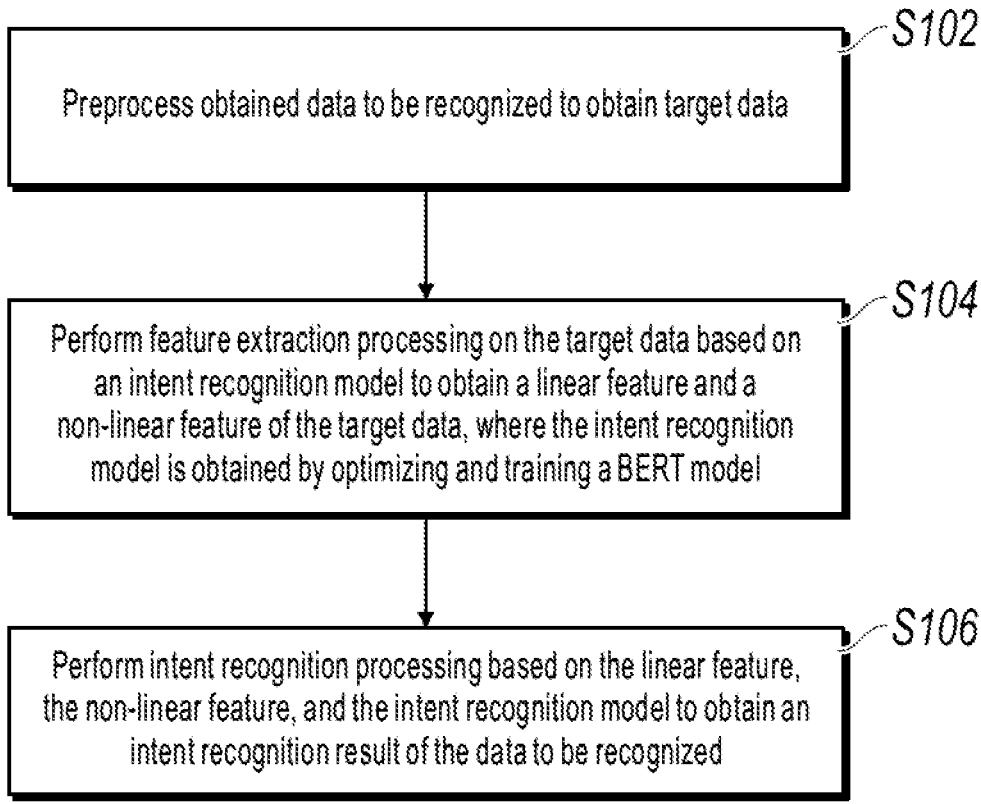
FIG. 3 is a first schematic flowchart illustrating an intent recognition method, according to one or more embodiments of this specification.

FIG. 3 is a schematic flowchart illustrating an intent recognition method, according to one or more embodiments of this specification. The method in FIG. 3 can be executed by an intent recognition apparatus, and the intent recognition apparatus can be disposed in a terminal device or a server. The terminal device includes a mobile phone, a tablet computer, a desktop computer, a portable notebook computer, etc. The server can be a separate server, or can be a server cluster includes a plurality of servers. As shown in FIG. 3, the method includes the following steps:

Step S102. Preprocess obtained data to be recognized to obtain target data.

Specifically, the data to be recognized are obtained, and the obtained data to be recognized are preprocessed to obtain the target data. The data to be recognized include text data to be recognized. The text data to be recognized can include one or more of a text, a number, a letter, a punctuation, a special symbol, etc. The special symbol includes @, *, &, etc.

The intent recognition method provided in the embodiments of this specification can be used to perform intent recognition on conversation content in an intelligent conversation system, and can also be used to perform intent recognition on an individual sentence. Specifically, in one implementation, obtaining the data to be recognized can include obtaining the data to be recognized from a designated intelligent conversation system. In another implementation, obtaining the data to be recognized can include receiving the data to be recognized sent by a request device. In still another implementation, the intent recognition apparatus can include an input module, and correspondingly, obtaining the data to be recognized can include obtaining the data to be recognized input by a user. A method for obtaining the data to be recognized can be set based on needs in actual applications. No specific limitation is imposed in this specification.

It is worthwhile to note that when the intent recognition apparatus performs intent recognition on the conversation content in the intelligent conversation system, the intent recognition apparatus and the intelligent conversation system can be independently disposed in a same terminal device or in a same server, or the intent recognition apparatus can be embedded into the intelligent conversation system as a part of the intelligent conversation system, or the intent recognition apparatus and the intelligent conversation system can be separately disposed in different terminal devices or in different servers.

Step S104. Perform feature extraction processing on the target data based on an intent recognition model to obtain a linear feature and a non-linear feature of the target data, where the intent recognition model is obtained by optimizing and training a bidirectional encoder representations from transformers (BERT) model.

Considering that a conventional BERT model has a large quantity of parameters and takes long time to process, etc., in the embodiments of this specification, the conventional BERT model is structurally optimized in advance, and is trained to obtain the intent recognition model so as to perform feature extraction processing on the target data based on the intent recognition model. For a specific structure of the intent recognition model and a specific process of feature extraction processing, references can be made to related descriptions below.

Step S106. Perform intent recognition processing based on the linear feature, the non-linear feature, and the intent recognition model to obtain an intent recognition result of the data to be recognized.

In one or more embodiments of this specification, the conventional BERT model is optimized in advance, and is trained to obtain the intent recognition model. In addition, feature extraction processing is performed, based on the intent recognition unit, on the target data obtained through preprocessing, to obtain the linear feature and the non-linear feature, and intent recognition processing is performed based on the linear feature and the non-linear feature to obtain the intent recognition result. As such, the BERT model is optimized, so that pre-training knowledge information of the BERT model can be well used to alleviate a problem that a conventional long short-term memory (LSTM) model and a conventional convolutional neural network for text (TextCNN) model have no knowledge reasoning capability, and alleviate problems such as long time taken by the conventional BERT model. Furthermore, the intent recognition model obtained by optimizing the BERT model can be used to extract the linear feature and the non-linear feature of the target data, to implement multi-feature extraction, and intent recognition is performed based on the multi-feature, thereby greatly improving intent recognition accuracy.

Figure 4:
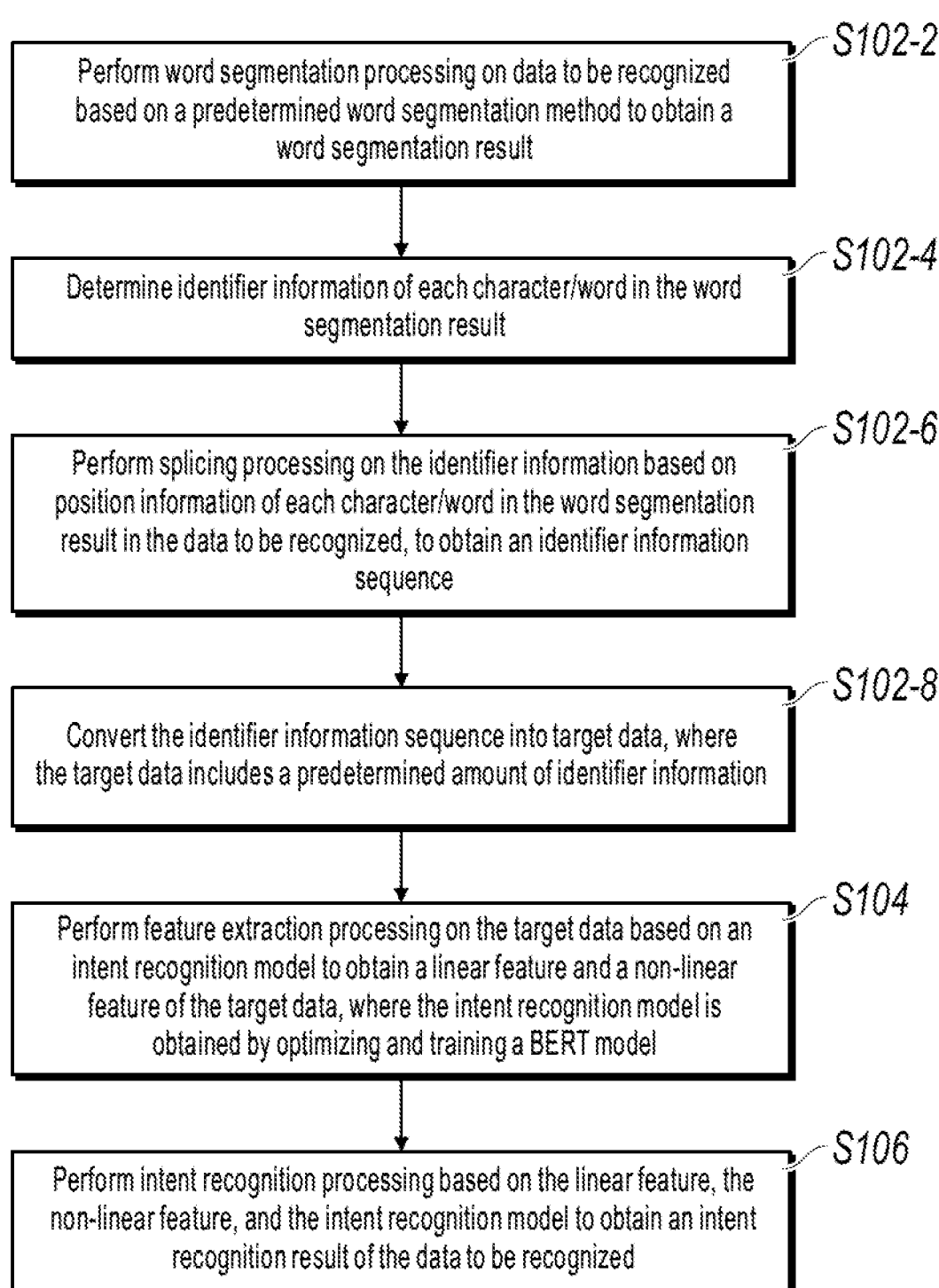
FIG. 4 is a second schematic flowchart illustrating an intent recognition method, according to one or more embodiments of this specification.

To effectively perform feature extraction processing to perform intent recognition, in one or more embodiments of this specification, the obtained data to be processed are first preprocessed. Specifically, as shown in FIG. 4, step S102 can include the following step S102-2 to step S102-8:

Step S102-2. Perform word segmentation processing on the data to be recognized based on a predetermined word segmentation method to obtain a word segmentation result.

The word segmentation method can be set based on needs in actual applications. In one implementation, the word segmentation result can be obtained by performing word segmentation processing on the data to be recognized by using a tokenizer in BERT. The word segmentation result includes one or more of a text, a Chinese word, a number, a letter, an English word, etc. In this specification, an individual text, number, letter, etc. are collectively referred to as characters, and the Chinese word, the English word, etc. are collectively referred to as words. For example, the data to be processed are "I want to buy a computer", and the word segmentation result is "I, want to, buy, a computer".

It is worthwhile to note that when the data to be recognized are a conversation in the intelligent conversation system, splicing processing can be firstly performed on a question part and an answer part of the conversation, and then word segmentation processing can be performed, based on the predetermined word segmentation method, on data obtained after splicing processing, to obtain the word segmentation result.

Step S102-4. Determine identifier information of each character/word in the word segmentation result.

Specifically, an association relationship between each character/word and identifier information is established in advance, and associated identifier information is obtained from the association relationship based on each character/word in the word segmentation result, and is determined as identifier information of a corresponding character/word. The identifier information can be a number, and quantities of numbers included in different identifier information can be different. For example, identifier information of a text "I" is 1, identifier information of a text "want to" is 10, identifier information of a text "buy" is 23, and identifier information of a word "a computer" is 68.

Step S102-6. Perform splicing processing on the identifier information based on position information of each character/word in the word segmentation result in the data to be recognized, to obtain an identifier information sequence.

Specifically, an order of the characters/words in the word segmentation result is determined based on the position information of each character/word in the word segmentation result in the data to be recognized, and splicing processing is performed on corresponding identifier information based on the determined order to obtain the identifier information sequence. The previous example is still used, and the identifier information sequence obtained through splicing processing is 1102368.

Step S102-8. Convert the identifier information sequence into target data, where the target data include a predetermined amount of identifier information.

Specifically, a relationship between a first amount of identifier information included in the identifier information sequence and the predetermined amount is determined. If the first amount is less than the predetermined amount, complement processing is performed on the identifier information sequence based on a predetermined complement method to obtain the target data including the predetermined amount of identifier information. If the first amount is equal to the predetermined amount, the identifier information sequence is determined as a target amount. If the first amount is greater than the predetermined amount, identifier information following the predetermined amount in the identifier information sequence is discarded in an order from front to back. Both the complement method and the predetermined amount can be set based on needs in actual applications. In one implementation, the complement method can be performing complement with predetermined identifier information (for example, "0"), and the predetermined amount can be 64. For example, if the first amount is 30, four "0"s are used for complement after the 30th identifier information. For another example, if the first amount is 68, the 65th to 68th identifier information are discarded in the order from front to back.

The data to be processed are preprocessed to obtain the target data, so that it can be ensured that the target data satisfy a data processing need of the intent recognition model, thereby effectively performing feature extraction processing and intent recognition processing.

Figure 5:
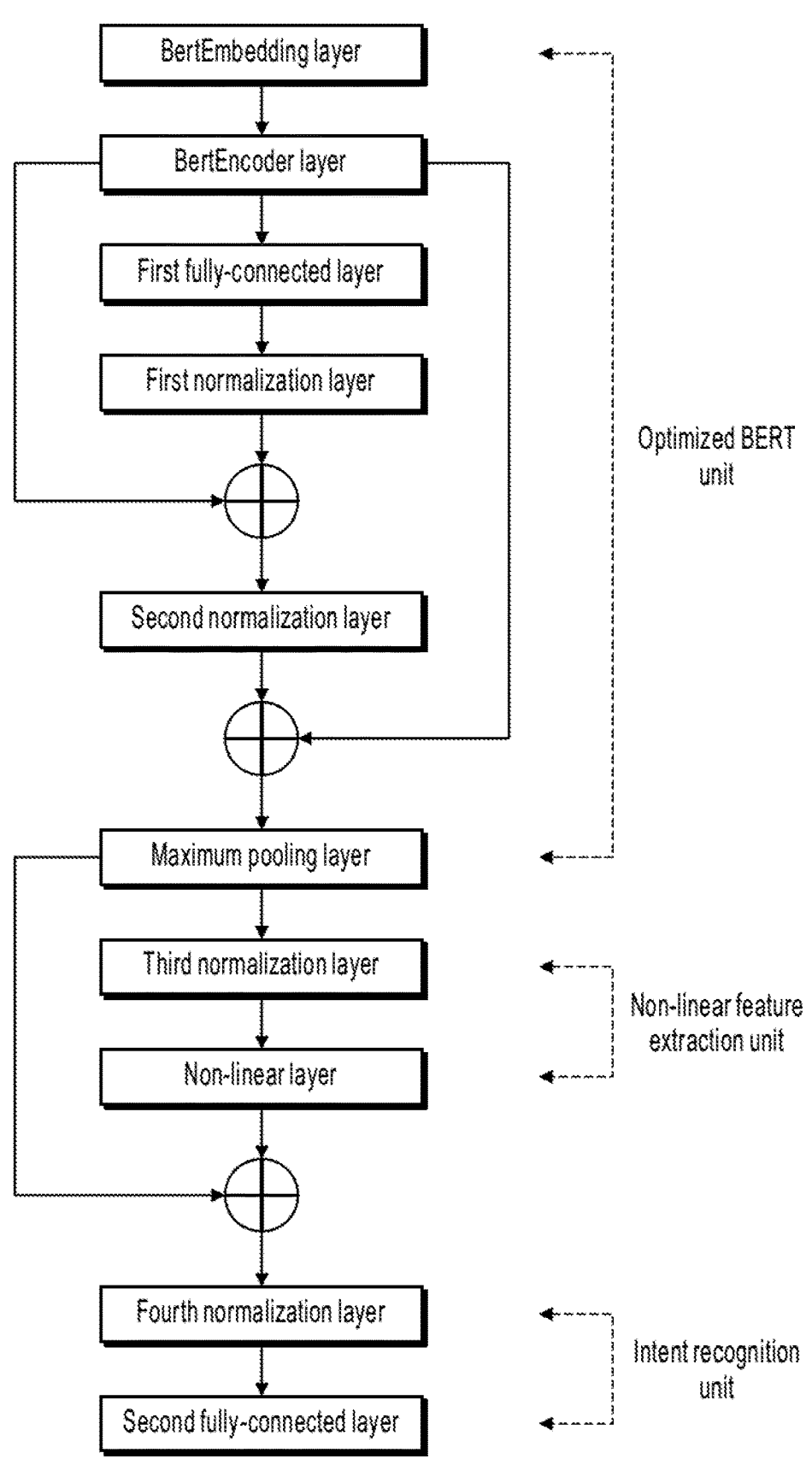
FIG. 5 is a schematic structural diagram illustrating an intent recognition model, according to one or more embodiments of this specification.

As shown in FIG. 5, the intent recognition model provided in the embodiments of this specification includes an optimized BERT unit, a non-linear feature extraction unit, and an intent recognition unit. Correspondingly, as shown in FIG. 6, step S104 can include the following step S104-2 and step S104-6, and step S106 can include the following step S106-2 and step S106-4:

Step S104-2. Perform linear feature extraction processing on the target data based on the optimized BERT unit of the intent recognition model to obtain the linear feature of the target data.

As shown in FIG. 3, the optimized BERT unit of the intent recognition model includes a BertEmbedding layer, a BertEncoder layer, a first fully-connected layer, a first normalization layer, a second normalization layer, and a maximum pooling layer. Correspondingly, step S102-2 can include the following step S102-2-2 to step S102-2-16:

Step S102-2-2. Perform conversion processing on each piece of identifier information in the target data by using the BertEmbedding layer to obtain converted data of each piece of identifier information.

Specifically, the target data are input to the BertEmbedding layer, and conversion processing is performed on each piece of identifier information in the target data by using the BertEmbedding layer to obtain converted data of a predetermined dimension of each piece of identifier information, and output the converted data. For a specific conversion processing method of the BertEmbedding layer, references can be made to the conversion processing method of the BertEmbedding layer of the conventional BERT model, and details are omitted in this specification. The predetermined dimension can be set based on needs in actual applications. For example, if the target data include 64 pieces of identifier information, and the predetermined dimension is 1*768, each piece of identifier information is converted into 1*768 converted data to obtain 64 pieces of 1*768 converted data.

Step S102-2-4. Determine an association relationship between the converted data by using the BertEncoder layer, and generate a first feature matrix of the target data based on the association relationship.

Specifically, the converted data are input to the BertEncoder layer, the association relationship between the converted data is determined by using the BertEncoder layer, the first feature matrix of the target data is generated based on the determined association relationship, and the first feature matrix is output. For a specific method for determining the association relationship between the converted data by using the BertEncoder layer and generating the first feature matrix, references can be made to the processing method of the BertEncoder layer of the conventional BERT model, and details are omitted in this specification. The previous example is still used, and the 64*768 first feature matrix is generated based on the 64 pieces of 1*768 converted data.

Step S102-2-6. Perform conversion processing on the first feature matrix by using the first fully-connected layer to obtain a second feature matrix.

Specifically, the first feature matrix is input to the first fully-connected layer, and multiplication processing is performed on the first feature matrix and a predetermined matrix by the first fully-connected layer to obtain the second feature matrix and output the second feature matrix. The first fully-connected layer can also be represented as a Linear layer. The previous example is still used, and conversion processing is performed on the 64*768 first feature matrix by using the first fully-connected layer to obtain the 64*768 second feature matrix.

Step S102-2-8. Perform first normalization processing on the second feature matrix by using the first normalization layer to obtain a third feature matrix.

Specifically, the second feature matrix is input to the first normalization layer, and first normalization processing is performed on the second feature matrix by using the first normalization layer to obtain the third feature matrix and output the third feature matrix. The first normalization layer can also be represented as a first Norm layer. A specific method of first normalization processing can be set based on needs in actual applications. First normalization processing is performed, so that it is ensured that a value of each element in the third feature matrix falls within a proper range, and a problem that a model effect is reduced because data are dispersed is alleviated. The previous example is still used, and first normalization processing is performed on the 64*768 second feature matrix by using the first normalization layer to obtain the 64*768 third feature matrix.

Step S102-2-10. Perform first combination processing on the first feature matrix and the third feature matrix to obtain a fourth feature matrix.

Specifically, addition processing is performed on the first feature matrix and the third feature matrix to obtain the fourth feature matrix. The previous example is still used, and addition processing is performed on the 64*768 first feature matrix and the 64*768 third feature matrix to obtain the 64*768 fourth feature matrix.

Step S102-2-12. Perform second normalization processing on the fourth feature matrix by using the second normalization layer to obtain a fifth feature matrix.

Specifically, the fourth feature matrix is input to the second normalization layer, and second normalization processing is performed on the fourth feature matrix by using the second normalization layer to obtain the fifth feature matrix and output the fifth feature matrix. The second normalization layer can also be represented as a second Norm layer. A method of second normalization processing can be the same as or different from the method of first normalization processing, and can be set based on needs in actual applications. The previous example is still used, and second normalization processing is performed on the 64*768 fourth feature matrix by using the second normalization layer to obtain the 64*768 fifth feature matrix.

Step S102-2-14. Perform second combination processing on the first feature matrix and the fifth feature matrix to obtain a sixth feature matrix.

Specifically, splicing processing is performed on the first feature matrix and the fifth feature matrix to obtain the sixth feature matrix. The previous example is still used, and splicing processing is performed on the 64*768 first feature matrix and the 64*768 fifth feature matrix to obtain the 64*1536 sixth feature matrix.

Step S102-2-16. Perform maximum pooling processing on the sixth feature matrix by using the maximum pooling layer to obtain the linear feature of the target data.

Specifically, the sixth feature matrix is input to the maximum pooling layer, comparison processing is performed on elements included in each column of the sixth feature matrix by using the maximum pooling layer to obtain a maximum element in each column, the linear feature of the target data is generated based on the maximum element in each column, and the linear feature is output. The previous example is used, and maximum pooling processing is performed on the 64*1536 sixth feature matrix by using the maximum pooling layer to obtain the 1*1536 linear feature of the target data. It can be seen that splicing process is performed on the first feature matrix and the fifth feature matrix, and then maximum pooling processing is performed, so that feature space is expanded, and a multi-label classification problem can be better alleviated.

Figure 1:
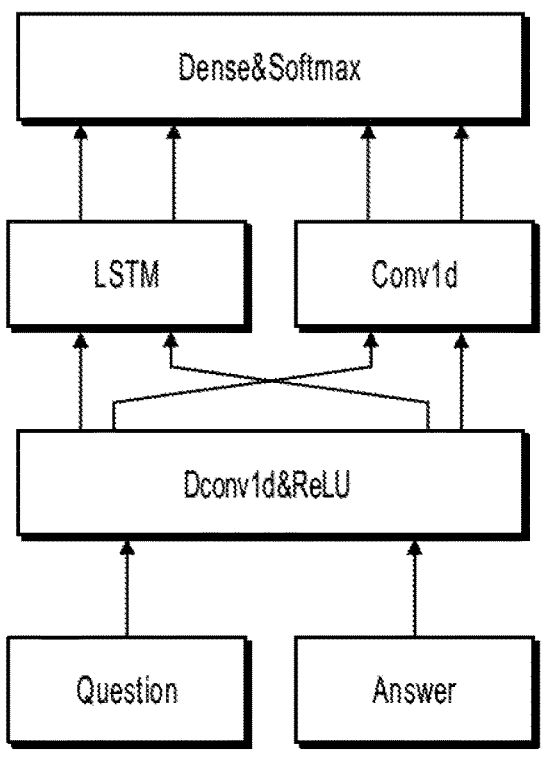
FIG. 1 is a schematic structural diagram illustrating a first intent recognition model in the existing technology.
Figure 2:
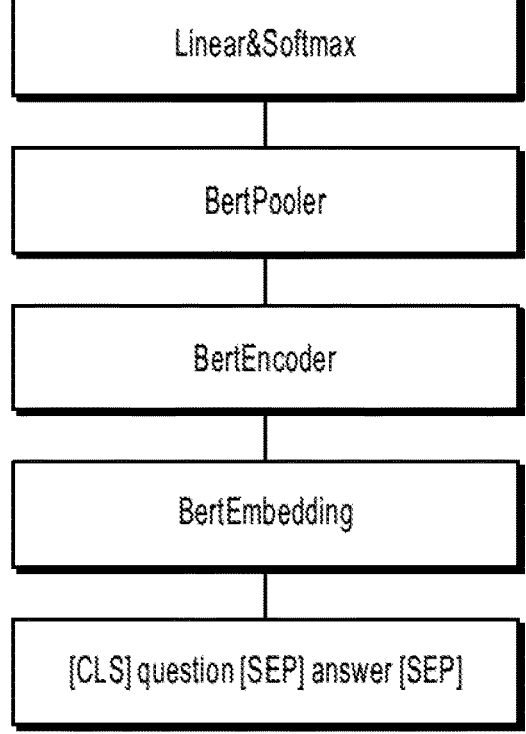
FIG. 2 is a schematic structural diagram illustrating a second intent recognition model in the existing technology.

It can be seen from FIG. 2 that, the conventional BERT model includes a BertEmbedding layer, a BertEncoder layer, and a BertPooler layer. A plurality of BertEncoder layers are usually set repeatedly. Generally, it's considered that if more BertEncoder layers are set, a recognition effect is better, but longer time is taken. In the conventional BERT model, a quantity of BertEncoder layers is usually set to 12. According to the optimized BERT unit in the intent recognition model provided in the embodiments of this specification, the BertPooler layer of the conventional BERT model is replaced with the first fully-connected layer, the first normalization layer, the second normalization layer, and the maximum pooling layer. As such, the linear feature is extracted and feature space is expanded, and five BertEncoder layers can be set to achieve a result close to a result of the conventional twelve BertEncoder layers. Therefore, a layer quantity of BertEncoder layers is greatly reduced, and time taken for reasoning is reduced.

F1 scores and time taken for reasoning of the combined model of LSTM and TextCNN, the conventional BERT model, and the intent recognition model provided in this specification are compared as follows:

| Model | F1 score | Time taken for reasoning |
|---|---|---|
| Combined model of LSTM and TextCNN | 84.27 | 15.63 ms |
| Conventional BERT model | 86.41 | 41.85 ms |
| Intent recognition model | 87.00 | 20.03 ms |

It can be seen that both the F1 score and the time taken for reasoning of the intent recognition model provided in this specification are better than the F1 scores and the time taken for reasoning of the combined model of LSTM and TextCNN and the conventional BERT model, that is, recognition accuracy is improved, and time taken for reasoning is reduced.

Step S104-4. Perform non-linear transformation processing on the linear feature of the target data based on the non-linear feature extraction unit of the intent recognition model to obtain the non-linear feature of the target data.

As shown in FIG. 5, the non-linear feature extraction unit includes a third normalization layer and a non-linear layer. Correspondingly, step S104-4 can include the following step S104-4-2 and step S104-4-4:

Step S104-4-2. Perform third normalization processing on the linear feature by using the third normalization layer to obtain a target linear feature.

Specifically, the linear feature is input to the third normalization layer, and third normalization processing is performed on the linear feature by using the third normalization layer to obtain the target linear feature and output the target linear feature. The third normalization layer can also be represented as a third Norm layer. A method of third normalization processing can be the same as or different from the method of first normalization processing and the method of second normalization processing, and can be set based on needs in actual applications. The previous example is still used, and third normalization processing is performed on the 1*1536 linear feature by using the third normalization layer to obtain the 1*1536 target linear feature.

Step S104-4-4. Perform non-linear transformation processing on the target linear feature by using the non-linear layer to obtain the non-linear feature of the target data.

Specifically, the target linear feature is input to the non-linear layer, and non-linear transformation processing is performed on the target linear feature by using an activation function in the non-linear layer to obtain the non-linear feature of the target data and output the non-linear feature. The previous example is still used, and non-linear transformation processing is performed on the 1*1536 target linear feature by using the non-linear layer to obtain the 1*1536 non-linear feature of the target data.

Step S106-2. Determine an intent classification label corresponding to the data to be recognized based on an intent recognition unit of the intent recognition model, the linear feature, and the non-linear feature.

As shown in FIG. 5, the intent recognition unit includes a fourth normalization layer and a second fully-connected layer. Correspondingly, step S106-2 can include the following step S106-2-2 to step S102-2-8:

Step S106-2-2. Perform first combination processing on the target linear feature and the non-linear feature to obtain a combined feature.

Specifically, addition processing is performed on the target linear feature and the non-linear feature to obtain the combined feature. The previous example is still used, and combining processing is performed on the 1*1536 target linear feature and the 1*1536 non-linear feature to obtain the 1*1536 combined feature.

Step S106-2-4. Perform fourth normalization processing on the combined feature by using the fourth normalization layer to obtain a target combined feature.

Specifically, the combined feature is input to the fourth normalization layer, and fourth normalization processing is performed on the combined feature by using the fourth normalization layer to obtain the target combined feature. The fourth normalization layer can also be represented as a fourth Norm layer. A procedure of fourth normalization processing can be the same as or different from the procedure of first normalization processing, the procedure of second normalization processing, and the procedure of third normalization processing, and can be set based on needs in actual applications. The previous example is still used, and fourth normalization processing is performed on the 1*1536 combined feature by using the fourth normalization layer to obtain the 1*1536 target combined feature.

Step S106-2-6. Map the target combined feature to probabilities in a one-to-one correspondence with predetermined intent classification labels by using the second fully-connected layer.

Specifically, the target combined feature is input to the second fully-connected layer, the target combined feature is mapped to the probabilities in a one-to-one correspondence with the predetermined intent classification labels by using the second fully-connected layer, and a seventh feature matrix including the probabilities is output. The previous example is still used, and if a quantity of the predetermined intent classification labels is m, the 1*1536 target combined feature is mapped to m probabilities by using the second fully-connected layer, and the 1*m seventh feature matrix that includes the m probabilities is output.

m is an integer greater than zero. Different intent recognition labels are used to identify different intents. For example, an intent recognition label 1 is used to identify that a corresponding intent is to purchase an electronic product, and an intent recognition label 2 is used to identify a logistics query intent.

Step S106-2-8. Obtain at least one target probability greater than a probability threshold from the probabilities, and determine an intent classification label corresponding to the target probability as the intent classification label corresponding to the data to be recognized.

Specifically, each probability in the seventh feature matrix is compared with the predetermined probability threshold to obtain the at least one target probability greater than the probability threshold, and the intent classification label corresponding to the at least one target probability is determined as the intent classification label corresponding to the data to be recognized.

Step S106-4. Determine the intent recognition result of the data to be recognized based on the intent classification label.

In actual applications, collision labels, that is, a plurality of labels that cannot hold at the same time, may exist in the intent recognition label corresponding to the target probability due to various factors. For example, the data to be processed are that the user expects to express an identity of the user, but the intent recognition label corresponding to the target probability includes an intent recognition label indicating that the identity of the user is a father, and further includes an intent recognition label indicating that the identity of the user is a mother. Because the two labels cannot hold at the same time, the two labels are collision labels. Based on this, in one or more embodiments of this specification, step S106-4 can include the following step S106-4-2 and step S106-4-4:

S106-4-2. Determine whether the intent classification label includes a predetermined collision label.

S106-4-4. If yes, remove an intent classification label with a small probability from the collision label, and determine the intent recognition result of the data to be recognized based on a remaining intent classification label.

Specifically, when m intent recognition labels are predetermined, a collision label in the m intent recognition labels is further set. After the intent classification label corresponding to the data to be recognized is obtained, it is determined whether the intent classification label corresponding to the data to be recognized includes a predetermined collision label. If the intent classification label includes a predetermined collision label, probabilities corresponding to intent classification labels included in the collision label are compared to obtain a maximum probability, and an intent corresponding to an intent classification label corresponding to the maximum probability is determined as the intent recognition result of the data to be recognized.

Therefore, the intent recognition result is determined by combining the linear feature and the non-linear feature, thereby greatly improving accuracy of the intent recognition result.

To implement efficient and accurate intent recognition, in one or more embodiments of this specification, before step S102, the method further includes the following step S100-2 and step S100-4:

Step S100-2. Obtain a sample data set to be trained, where each piece of sample data in the sample data set is labeled with an intent classification label.

In an implementation, a plurality of pieces of sample data can be obtained from the intelligent conversation system, and labeling processing is performed on the plurality of pieces of sample data by using an intent classification label to obtain the sample data set to be trained. A method for obtaining the sample data set is not specifically limited in this specification, and can be set based on needs in actual applications.

Step S100-4. Perform model training processing based on the sample data set to obtain the intent recognition model.

Specifically, the sample data set is iteratively input to a model to be trained, and feature extraction processing is performed on each piece of sample data in the training set based on the model to be trained to obtain a linear feature and a non-linear feature of each piece of sample data. Intent recognition processing is performed based on the extracted linear feature, the extracted non-linear feature, and the model to be trained to obtain a predicted intent classification label of the sample data. If it is determined, based on a predetermined loss function, the intent classification label that the sample data is labeled with, and the predicted intent classification label corresponding to the sample data, that a predetermined training stop condition is satisfied, a corresponding model to be trained is determined as the intent recognition model.

For a specific process of performing feature extraction processing on each piece of sample data in the training set based on the model to be trained to obtain the linear feature and the non-linear feature of each piece of sample data, and performing intent recognition processing based on the extracted linear feature, the extracted non-linear feature, and the model to be trained, references can be made to the previous related descriptions, and details are not repeatedly described here. The training stop condition can be set based on needs in actual applications, for example, a quantity of training times reaches a predetermined quantity of times, or it is determined, based on the loss function, that recognition accuracy is greater than predetermined accuracy. The loss function can be Softmax, etc. The sample data set can be further divided into a training set and a test set. The previous training processing is performed based on the training set, and when it is determined that the predetermined training stop condition is satisfied, a corresponding model to be trained is determined as an intent recognition model to be tested. Test processing is performed on the intent recognition model to be tested based on the test set. If a test result satisfies a predetermined condition, the intent recognition model to be tested is determined as a final intent recognition model. If a test result does not satisfy a predetermined condition, training processing is performed again based on the training set. A specific training process can be set based on needs in actual applications.

In one or more embodiments of this specification, the conventional BERT model is optimized in advance, and is trained to obtain the intent recognition model. In addition, feature extraction processing is performed, based on the intent recognition unit, on the target data obtained through preprocessing, to obtain the linear feature and the non-linear feature, and intent recognition processing is performed based on the linear feature and the non-linear feature to obtain the intent recognition result. As such, the BERT model is optimized, so that pre-training knowledge information of the BERT model can be well used to alleviate a problem that a conventional LSTM model and a conventional TextCNN model have no knowledge reasoning capability, and alleviate problems such as long time taken by the conventional BERT model. Furthermore, the intent recognition model obtained by optimizing the BERT model can be used to extract the linear feature and the non-linear feature of the target data, to implement multi-feature extraction, and intent recognition is performed based on the multi-feature, thereby greatly improving intent recognition accuracy.

Corresponding to the intent recognition method described above, based on the same technical concept, one or more embodiments of this specification further provide an intent recognition apparatus. FIG. 7 is a schematic composition diagram illustrating modules of an intent recognition apparatus, according to one or more embodiments of this specification. As shown in FIG. 7, the apparatus includes the following: a preprocessing module 201, configured to preprocess obtained data to be recognized to obtain target data; a feature extraction module 202, configured to perform feature extraction processing on the target data based on an intent recognition model to obtain a linear feature and a non-linear feature of the target data, where the intent recognition model is obtained by optimizing and training a BERT model; and an intent recognition module 203, configured to perform intent recognition processing based on the linear feature, the non-linear feature, and the intent recognition model to obtain an intent recognition result of the data to be recognized.

Optionally, the intent recognition model includes an optimized BERT unit and a non-linear feature extraction unit.

Correspondingly, the feature extraction module 202 performs linear feature extraction processing on the target data based on the optimized BERT unit to obtain the linear feature of the target data, and performs non-linear transformation processing on the linear feature of the target data based on the non-linear feature extraction unit to obtain the non-linear feature of the target data.

Optionally, the intent recognition module 203 determines an intent classification label corresponding to the data to be recognized based on an intent recognition unit of the intent recognition model, the linear feature, and the non-linear feature, and determines the intent recognition result of the data to be recognized based on the intent classification label.

Optionally, the apparatus further includes an acquisition module and a training module.

The acquisition module obtains a sample data set to be trained, where each piece of sample data in the sample data set is labeled with an intent classification label.

The training module performs model training processing based on the sample data set to obtain the intent recognition model.

According to the intent recognition apparatus provided in one or more embodiments of this specification, the conventional BERT model is optimized in advance, and is trained to obtain the intent recognition model. In addition, feature extraction processing is performed, based on the intent recognition unit, on the target data obtained through preprocessing, to obtain the linear feature and the non-linear feature, and intent recognition processing is performed based on the linear feature and the non-linear feature to obtain the intent recognition result. As such, the BERT model is optimized, so that pre-training knowledge information of the BERT model can be well used to alleviate a problem that a conventional LSTM model and a conventional TextCNN model have no knowledge reasoning capability, and alleviate problems such as long time taken by the conventional BERT model. Furthermore, the intent recognition model obtained by optimizing the BERT model can be used to extract the linear feature and the non-linear feature of the target data, to implement multi-feature extraction, and intent recognition is performed based on the multi-feature, thereby greatly improving intent recognition accuracy.

It is worthwhile to note that the embodiments of the intent recognition apparatus in this specification and the embodiments of the intent recognition method in this specification are based on the same technical concept. Therefore, for specific implementation of the embodiments, references can be made to the implementation of the previous corresponding intent recognition method, and details are not repeatedly described here.

Figure 8:
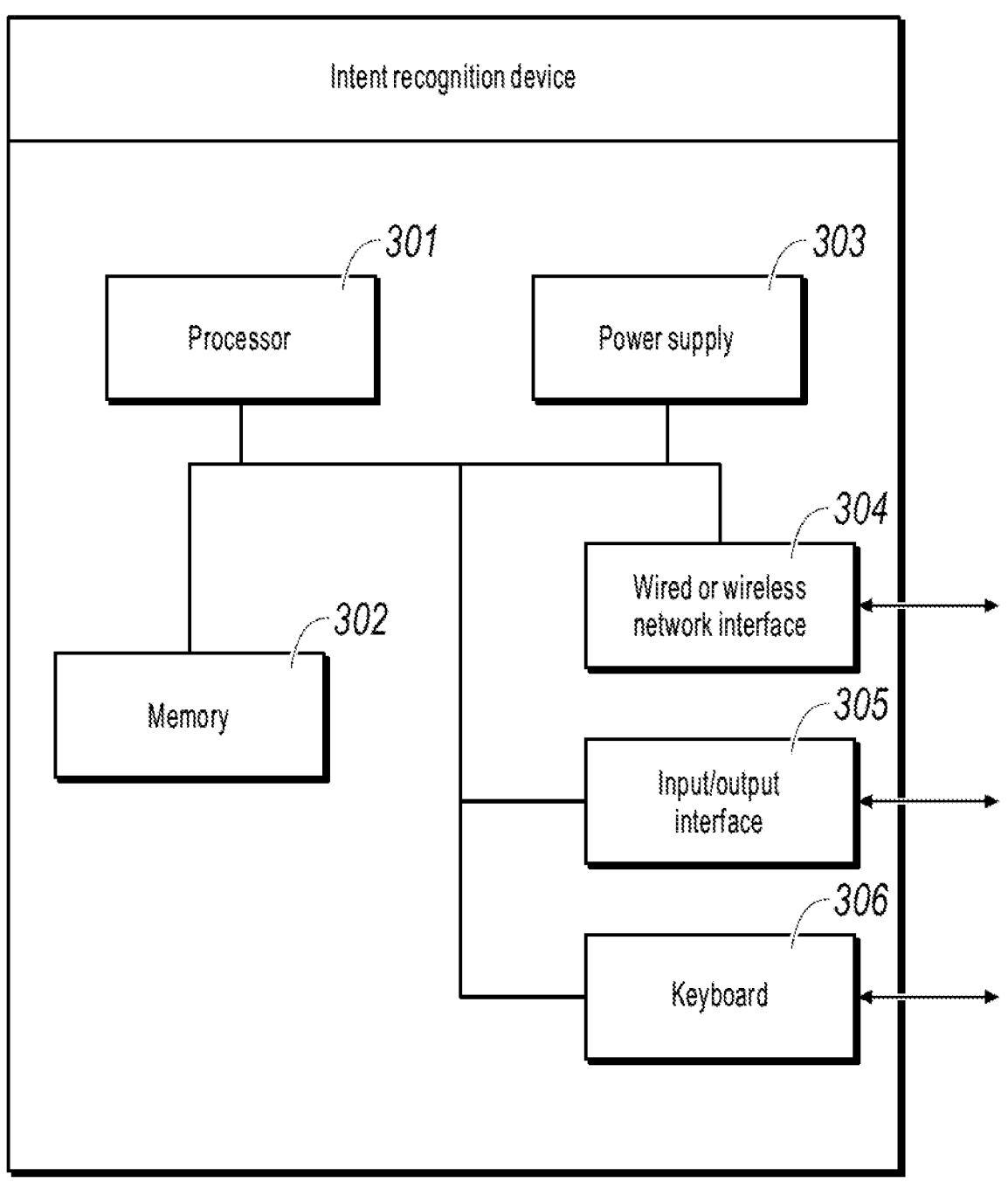
FIG. 8 is a schematic structural diagram illustrating an intent recognition device, according to one or more embodiments of this specification.

Further, corresponding to the intent recognition method described above, based on the same technical concept, one or more embodiments of this specification further provide an intent recognition device. The device is configured to perform the previous intent recognition method. FIG. 8 is a schematic structural diagram illustrating an intent recognition device, according to one or more embodiments of this specification.

As shown in FIG. 8, the intent recognition device can vary greatly based on configuration or performance, and can include one or more processors 301 and a memory 302. The memory 302 can store one or more stored applications or data. The memory 302 can be used for transient storage or persistent storage. The applications stored in the memory 302 can include one or more modules (not shown in the figure), and each module can include a series of computer-executable instructions in the intent recognition device. Still further, the processor 301 can be configured to communicate with the memory 302, and execute a series of computer-executable instructions in the memory 302 on the intent recognition device. The intent recognition device can further include one or more power supplies 303, one or more wired or wireless network interfaces 304, one or more input/output interfaces 305, one or more keyboards 306, etc.

In one or more specific embodiments, the intent recognition device includes a memory and one or more programs. The one or more programs are stored in the memory. The one or more programs can include one or more modules. Each module can include a series of computer-executable instructions in the intent recognition device. The one or more processors are configured to execute the following computer-executable instructions included in the one or more programs: preprocessing obtained data to be recognized to obtain target data; performing feature extraction processing on the target data based on an intent recognition model to obtain a linear feature and a non-linear feature of the target data, where the intent recognition model is obtained by optimizing and training a BERT model; and performing intent recognition processing based on the linear feature, the non-linear feature, and the intent recognition model to obtain an intent recognition result of the data to be recognized.

According to the intent recognition device provided in one or more embodiments of this specification, the conventional BERT model is optimized in advance, and is trained to obtain the intent recognition model. In addition, feature extraction processing is performed, based on the intent recognition unit, on the target data obtained through pre-processing, to obtain the linear feature and the non-linear feature, and intent recognition processing is performed based on the linear feature and the non-linear feature to obtain the intent recognition result. As such, the BERT model is optimized, so that pre-training knowledge information of the BERT model can be well used to alleviate a problem that a conventional LSTM model and a conventional TextCNN model have no knowledge reasoning capability, and alleviate problems such as long time taken by the conventional BERT model. Furthermore, the intent recognition model obtained by optimizing the BERT model can be used to extract the linear feature and the non-linear feature of the target data, to implement multi-feature extraction, and intent recognition is performed based on the multi-feature, thereby greatly improving intent recognition accuracy.

It is worthwhile to note that the embodiments of the intent recognition device in this specification and the embodiments of the intent recognition method in this specification are based on the same technical concept. Therefore, for specific implementation of the embodiments, references can be made to the implementation of the previous corresponding intent recognition method, and details are not repeatedly described here.

Further, corresponding to the intent recognition method described above, based on the same technical concept, one or more embodiments of this specification further provide a storage medium, configured to store computer-executable instructions. In one or more specific embodiments, the storage medium can be a universal serial bus (USB) flash drive, an optical disc, a hard disk, etc. When the computer-executable instructions stored in the storage medium are executed by a processor, the following procedure can be implemented: preprocessing obtained data to be recognized to obtain target data; performing feature extraction processing on the target data based on an intent recognition model to obtain a linear feature and a non-linear feature of the target data, where the intent recognition model is obtained by optimizing and training a BERT model; and performing intent recognition processing based on the linear feature, the non-linear feature, and the intent recognition model to obtain an intent recognition result of the data to be recognized.

When the computer-executable instructions stored in the storage medium provided in one or more embodiments of this specification are executed by the processor, the conventional BERT model is optimized in advance, and is trained to obtain the intent recognition model. In addition, feature extraction processing is performed, based on the intent recognition unit, on the target data obtained through pre-processing, to obtain the linear feature and the non-linear feature, and intent recognition processing is performed based on the linear feature and the non-linear feature to obtain the intent recognition result. As such, the BERT model is optimized, so that pre-training knowledge information of the BERT model can be well used to alleviate a problem that a conventional LSTM model and a conventional TextCNN model have no knowledge reasoning capability, and alleviate problems such as long time taken by the conventional BERT model. Furthermore, the intent recognition model obtained by optimizing the BERT model can be used to extract the linear feature and the non-linear feature of the target data, to implement multi-feature extraction, and intent recognition is performed based on the multi-feature, thereby greatly improving intent recognition accuracy.

It is worthwhile to note that the embodiments of the storage medium in this specification and the embodiments of the intent recognition method in this specification are based on the same technical concept. Therefore, for specific implementation of the embodiments, references can be made to the implementation of the previous corresponding intent recognition method, and details are not repeatedly described here.

Specific embodiments of this specification are described above. Other embodiments fall within the scope of the appended claims. In some situations, the actions or steps described in the claims can be performed in an order different from the order in the embodiments, and the desired results can still be achieved. In addition, the process depicted in the accompanying drawings does not necessarily need a particular execution order to achieve the desired results. In some implementations, multi-tasking and concurrent processing is feasible or can be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. There- fore, a method procedure can be improved by using a hardware entity module. For example, a programmable logic device (PLD) (for example, a field programmable gate array (FPGA)) is such an integrated circuit, and a logical function of the PLD is determined by a user through device program- ming. The designer performs programming to "integrate" a digital system to a PLD without requesting a chip manufac- turer to design and produce an application-specific inte- grated circuit (ASIC) chip. In addition, at present, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Conflu- ence, the Cornell University Programming Language (CUPL), HDCal, the Java Hardware Description Language (JHDL), Lava, Lola, MyHDL, PALASM, and the Ruby Hardware Description Language (RHDL). The very-high- speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firm- ware) that can be executed by the microprocessor or the processor, a logic gate, a switch, an ASIC, a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to imple- ment the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to imple- ment various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementa- tion device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or any combination of these devices.

For ease of description, the apparatus above is described by dividing functions into various units. Certainly, when the embodiments of this specification are implemented, func- tions of the units can be implemented in one or more pieces of software and/or hardware.

A person skilled in the art should understand that one or more embodiments of this specification can be provided as a method, a system, or a computer program product. There- fore, the one or more embodiments of this specification can use a form of hardware only embodiments, software only embodiments, or embodiments with a combination of soft- ware and hardware. Moreover, this specification can use a form of a computer program product that is implemented on one or more computer-usable storage media (including but not limited to a disk memory, a compact disc read-only memory (CD-ROM), an optical memory, etc.) that include computer-usable program code.

This specification is described with reference to the flowcharts and/or block diagrams of the method, the device (system), and the computer program product based on the embodiments of this specification. It is worthwhile to note that computer program instructions can be used to imple- ment each process and/or each block in the flowcharts and/or the block diagrams and a combination of a process and/or a block in the flowcharts and/or the block diagrams. These computer program instructions can be provided for a gen- eral-purpose computer, a dedicated computer, an embedded processor, or a processor of another programmable data processing device to generate a machine, so that the instruc- tions executed by the computer or the processor of other programmable data processing devices generate a device for implementing a specific function in one or more processes in the flowcharts and/or in one or more blocks in the block diagrams.

These computer program instructions can be stored in a computer readable memory that can instruct the computer or other programmable data processing devices to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or other programmable devices, thereby generating computer-implemented processing. Therefore, the instructions executed on the computer or other program- mable devices provide steps for implementing a specific function in one or more processes in the flowcharts and/or in one or more blocks in the block diagrams.

In a typical configuration, a computing device includes one or more central processing units (CPU), input/output interfaces, network interfaces, and memories.

The memory can include a non-persistent memory, a random access memory (RAM), a non-volatile memory, and/or another form that are in a computer readable medium, for example, a read-only memory (ROM) or a flash memory. The memory is an example of the computer readable medium.

The computer readable medium includes permanent and non-permanent, removable and non-removable media, and can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EE-PROM), a flash memory or another memory technology, a CD-ROM, a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. As described in this specification, the computer readable medium does not include computer readable transitory media such as a modulated data signal and a carrier.

It is worthwhile to further note that, the terms "include", "comprise", or any other variants are intended to cover a non-exclusive inclusion, so a process, a method, a product or a device that includes a list of elements not only includes those elements but also includes other elements that are not expressly listed, or further includes elements inherent to such process, method, product or device. Without more constraints, an element preceded by "includes a . . . " does not preclude the existence of additional identical elements in the process, method, product or device that includes the element.

The one or more embodiments of this specification can be described in the general context of computer-executable instructions executed by a computer, for example, a program module. Generally, the program module includes a routine, a program, an object, a component, a data structure, etc. executing a specific task or implementing a specific abstract data type. The one or more embodiments of this specification can alternatively be practiced in a distributed computing environment. In the distributed computing environment, tasks are performed by remote processing devices that are connected through a communication network. In the distributed computing environment, the program module can be located in both local and remote computer storage media including storage devices.

The embodiments in this specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

The previous descriptions are merely embodiments of this specification, and are not intended to limit this specification. A person skilled in the art can make various modifications and changes to this specification. Any modification, equivalent replacement, or improvement made without departing from the spirit and principle of this specification shall fall within the scope of the claims in this specification.

What is claimed is:

1. A computer-implemented method for intent recognition, comprising:

obtaining a sample data set to be trained, wherein each piece of sample data in the sample data set is labeled with an intent classification label;

performing model training processing based on the sample data set to obtain an intent recognition model;

preprocessing obtained data to be recognized to obtain target data, wherein preprocessing obtained data to be recognized to obtain target data comprises:

performing word segmentation processing on the obtained data to be recognized using a tokenize associated with the intent recognition model to obtain a word segmentation result;

determining identifier information of each character/word in the word segmentation result;

performing splicing processing on the identifier information of each character/word in the word segmentation result based on position information of each character/word in the word segmentation result in the obtained data to be recognized, to obtain an identifier information sequence; and converting the identifier information sequence into target data, wherein the target data comprise a fixed-length representation of identifier information;

performing feature extraction processing on the target data based on the intent recognition model to obtain a linear feature and a non-linear feature of the target data, wherein the intent recognition model is obtained by optimizing and training a bidirectional encoder representations from transformers (BERT) model; and performing intent recognition processing based on the linear feature, the non-linear feature, and the intent recognition model to obtain an intent recognition result of the obtained data to be recognized.

2. The computer-implemented method of claim 1, wherein:

the intent recognition model comprises an optimized BERT unit and a non-linear feature extraction unit; and performing feature extraction processing on the target data based on an intent recognition model to obtain a linear feature and a non-linear feature of the target data, comprises:

performing linear feature extraction processing on the target data based on the optimized BERT unit to obtain the linear feature of the target data; and performing non-linear transformation processing on the linear feature of the target data based on the non-linear feature extraction unit to obtain the non-linear feature of the target data.

3. The computer-implemented method of claim 2, wherein:

the optimized BERT unit comprises a BertEmbedding layer, a BertEncoder layer, a first fully-connected layer, a first normalization layer, a second normalization layer, and a maximum pooling layer; and performing linear feature extraction processing on the target data based on the optimized BERT unit to obtain the linear feature of the target data, comprises:

performing conversion processing on each piece of identifier information in the target data by using the BertEmbedding layer to obtain converted data of each piece of identifier information;

determining an association relationship between the converted data of each piece of identifier information by using the BertEncoder layer, and generating a first feature matrix of the target data based on the association relationship;

performing conversion processing on the first feature matrix by using the first fully-connected layer to obtain a second feature matrix;

performing first normalization processing on the second feature matrix by using the first normalization layer to obtain a third feature matrix;

performing first combination processing on the first feature matrix and the third feature matrix to obtain a fourth feature matrix;

performing second normalization processing on the fourth feature matrix by using the second normalization layer to obtain a fifth feature matrix;

performing second combination processing on the first feature matrix and the fifth feature matrix to obtain a sixth feature matrix; and performing maximum pooling processing on the sixth feature matrix by using the maximum pooling layer to obtain the linear feature of the target data.

4. The computer-implemented method of claim 2, wherein:

the non-linear feature extraction unit comprises a third normalization layer and a non-linear layer; and performing non-linear transformation processing on the linear feature of the target data based on the non-linear feature extraction unit to obtain the non-linear feature of the target data, comprises:

performing third normalization processing on the linear feature by using the third normalization layer to obtain a target linear feature; and performing non-linear transformation processing on the target linear feature by using the non-linear layer to obtain the non-linear feature of the target data.

5. The computer-implemented method of claim 4, wherein performing intent recognition processing based on the linear feature, the non-linear feature, and the intent recognition model to obtain an intent recognition result of the obtained data to be recognized, comprises:

determining an intent classification label corresponding to the obtained data to be recognized based on an intent recognition unit of the intent recognition model, the linear feature, and the non-linear feature; and determining the intent recognition result of the obtained data to be recognized based on the intent classification label.

6. The computer-implemented method of claim 5, wherein:

the intent recognition unit comprises a fourth normalization layer and a second fully-connected layer; and determining an intent classification label corresponding to the obtained data to be recognized based on an intent recognition unit of the intent recognition model, the linear feature, and the non-linear feature comprises:

performing first combination processing on the target linear feature and the non-linear feature to obtain a combined feature;

performing fourth normalization processing on the combined feature by using the fourth normalization layer to obtain a target combined feature;

mapping the target combined feature to probabilities in a one-to-one correspondence with predetermined intent classification labels by using the second fully-connected layer; and obtaining at least one target probability greater than a probability threshold from the probabilities, and determining an intent classification label corresponding to the target probability as the intent classification label corresponding to the obtained data to be recognized.

7. The computer-implemented method of claim 6, wherein determining the intent recognition result of the obtained data to be recognized based on the intent classification label, comprises:

determining whether the intent classification label comprises a predetermined collision label; and if yes, determining the intent recognition result of the obtained data to be recognized based on an intent classification label with a largest probability in the predetermined collision label.

8. The computer-implemented method of claim 1, wherein performing model training processing based on the sample data set to obtain the intent recognition model, comprises:

iteratively inputting the sample data set into a model to be trained, and performing feature extraction processing on each piece of sample data in the training set based on the model to be trained to obtain a linear feature and a non-linear feature of each piece of sample data;

performing intent recognition processing based on the linear feature, the non-linear feature, and the model to be trained to obtain a predicted intent classification label of the sample data; and if determining, based on a predetermined loss function, the intent classification label that the sample data is labeled with, and the predicted intent classification label, that a predetermined training stop condition is satisfied, determining a corresponding model to be trained as the intent recognition model.

9. A non-transitory, computer-readable medium storing one or more instructions executable by a computer system to perform operations, comprising:

obtaining a sample data set to be trained, wherein each piece of sample data in the sample data set is labeled with an intent classification label;

performing model training processing based on the sample data set to obtain an intent recognition model;

preprocessing obtained data to be recognized to obtain target data, wherein preprocessing obtained data to be recognized to obtain target data comprises:

performing word segmentation processing on the obtained data to be recognized using a tokenize associated with the intent recognition model to obtain a word segmentation result;

determining identifier information of each character/word in the word segmentation result;

performing splicing processing on the identifier information of each character/word in the word segmentation result based on position information of each character/word in the word segmentation result in the obtained data to be recognized, to obtain an identifier information sequence; and converting the identifier information sequence into target data, wherein the target data comprise a fixed-length representation of identifier information;

performing feature extraction processing on the target data based on the intent recognition model to obtain a linear feature and a non-linear feature of the target data, wherein the intent recognition model is obtained by optimizing and training a bidirectional encoder representations from transformers (BERT) model; and performing intent recognition processing based on the linear feature, the non-linear feature, and the intent recognition model to obtain an intent recognition result of the obtained data to be recognized.

10. The non-transitory, computer-readable medium of claim 9, wherein:

the intent recognition model comprises an optimized BERT unit and a non-linear feature extraction unit; and performing feature extraction processing on the target data based on an intent recognition model to obtain a linear feature and a non-linear feature of the target data, comprises:

performing linear feature extraction processing on the target data based on the optimized BERT unit to obtain the linear feature of the target data; and performing non-linear transformation processing on the linear feature of the target data based on the non-linear feature extraction unit to obtain the non-linear feature of the target data.

11. The non-transitory, computer-readable medium of claim 10, wherein:

the optimized BERT unit comprises a BertEmbedding layer, a BertEncoder layer, a first fully-connected layer, a first normalization layer, a second normalization layer, and a maximum pooling layer; and performing linear feature extraction processing on the target data based on the optimized BERT unit to obtain the linear feature of the target data, comprises:

performing conversion processing on each piece of identifier information in the target data by using the BertEmbedding layer to obtain converted data of each piece of identifier information;

determining an association relationship between the converted data of each piece of identifier information by using the BertEncoder layer, and generating a first feature matrix of the target data based on the association relationship;

performing conversion processing on the first feature matrix by using the first fully-connected layer to obtain a second feature matrix;

performing first normalization processing on the second feature matrix by using the first normalization layer to obtain a third feature matrix;

performing first combination processing on the first feature matrix and the third feature matrix to obtain a fourth feature matrix;

performing second normalization processing on the fourth feature matrix by using the second normalization layer to obtain a fifth feature matrix;

performing second combination processing on the first feature matrix and the fifth feature matrix to obtain a sixth feature matrix; and performing maximum pooling processing on the sixth feature matrix by using the maximum pooling layer to obtain the linear feature of the target data.

12. The non-transitory, computer-readable medium of claim 10, wherein:

the non-linear feature extraction unit comprises a third normalization layer and a non-linear layer; and performing non-linear transformation processing on the linear feature of the target data based on the non-linear feature extraction unit to obtain the non-linear feature of the target data, comprises:

performing third normalization processing on the linear feature by using the third normalization layer to obtain a target linear feature; and performing non-linear transformation processing on the target linear feature by using the non-linear layer to obtain the non-linear feature of the target data.

13. The non-transitory, computer-readable medium of claim 12, wherein performing intent recognition processing based on the linear feature, the non-linear feature, and the intent recognition model to obtain an intent recognition result of the obtained data to be recognized, comprises:

determining an intent classification label corresponding to the obtained data to be recognized based on an intent recognition unit of the intent recognition model, the linear feature, and the non-linear feature; and determining the intent recognition result of the obtained data to be recognized based on the intent classification label.

14. The non-transitory, computer-readable medium of claim 13, wherein:

the intent recognition unit comprises a fourth normalization layer and a second fully-connected layer; and determining an intent classification label corresponding to the obtained data to be recognized based on an intent recognition unit of the intent recognition model, the linear feature, and the non-linear feature comprises:

performing first combination processing on the target linear feature and the non-linear feature to obtain a combined feature;

performing fourth normalization processing on the combined feature by using the fourth normalization layer to obtain a target combined feature;

mapping the target combined feature to probabilities in a one-to-one correspondence with predetermined intent classification labels by using the second fully-connected layer; and obtaining at least one target probability greater than a probability threshold from the probabilities, and determining an intent classification label corresponding to the target probability as the intent classification label corresponding to the obtained data to be recognized.

15. The non-transitory, computer-readable medium of claim 14, wherein determining the intent recognition result of the obtained data to be recognized based on the intent classification label, comprises:

determining whether the intent classification label comprises a predetermined collision label; and if yes, determining the intent recognition result of the obtained data to be recognized based on an intent classification label with a largest probability in the predetermined collision label.

16. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining a sample data set to be trained, wherein each piece of sample data in the sample data set is labeled with an intent classification label;

performing model training processing based on the sample data set to obtain an intent recognition model;

preprocessing obtained data to be recognized to obtain target data, wherein preprocessing obtained data to be recognized to obtain target data comprises:

performing word segmentation processing on the obtained data to be recognized using a tokenize associated with the intent recognition model to obtain a word segmentation result;

determining identifier information of each character/word in the word segmentation result;

performing splicing processing on the identifier information of each character/word in the word segmentation result based on position information of each character/word in the word segmentation result in the obtained data to be recognized, to obtain an identifier information sequence; and converting the identifier information sequence into target data, wherein the target data comprise a fixed-length representation of identifier information;

performing feature extraction processing on the target data based on the intent recognition model to obtain a linear feature and a non-linear feature of the target data, wherein the intent recognition model is obtained by optimizing and training a bidirectional encoder representations from transformers (BERT) model; and performing intent recognition processing based on the linear feature, the non-linear feature, and the intent recognition model to obtain an intent recognition result of the obtained data to be recognized.

* * * * *